United States Patent
Beidler

[15] 3,670,794
[45] June 20, 1972

[54] SELF-LOCKING TUBULAR INSERT

[72] Inventor: William F. Beidler, La Habra, Calif.

[73] Assignee: Treadline Fastener Corporation, Covina, Calif.

[22] Filed: Oct. 24, 1969

[21] Appl. No.: 869,164

[52] U.S. Cl. .................................................. 151/7
[51] Int. Cl. ............................................ F16b 39/34
[58] Field of Search ................................... 151/7

[56] References Cited

UNITED STATES PATENTS

| | | | |
|---|---|---|---|
| 2,621,697 | 12/1952 | McPherson | 151/7 |
| 2,852,056 | 9/1958 | Raputa | 151/7 |
| 3,173,466 | 3/1965 | Starriett | 151/7 |
| 2,725,915 | 12/1955 | Johnson | 151/7 |
| 3,269,443 | 8/1966 | Coyle | 151/7 |
| 3,437,118 | 4/1969 | Coyle | 151/7 |

FOREIGN PATENTS OR APPLICATIONS 1,139,217  1/1969  Great Britain ........................... 151/7

Primary Examiner—Edward C. Allen
Attorney—Paul A. Weilein

[57] ABSTRACT

A self-locking tubular insert with an outer screw thread for engaging an outer complementary threaded member and with an inner screw thread for engaging an inner complementary threaded member has a transverse peripheral slot forming a window and a deformable plastic locking element seated in the slot is shaped and sized for compression by the outer complementary member to be bulged thereby inwardly into locking engagement with the inner complementary member.

17 Claims, 13 Drawing Figures

INVENTOR
WILLIAM F. BEIDLER
BY
Paul A. Weilein
ATTORNEY

INVENTOR
WILLIAM F. BEIDLER
BY
Paul A. Weilein
ATTORNEY

SELF-LOCKING TUBULAR INSERT

BACKGROUND OF THE INVENTION

The invention relates to a self-locking internally and externally threaded tubular insert having a transverse peripheral slot with a plastic locking element therein of the general character disclosed in the Coyle U.S. Pat. No. 3,269,443. The Coyle patent discloses a solid externally threaded screw with a transverse slot along a chord of the circular cross sectional configuration of the solid screw with a deformable plastic element therein for locking action against a surrounding complementary internally threaded member.

The present invention is directed to certain problems that do not arise in the use of solid screws of this type but are encountered in any attempt to provide an internally and externally threaded tubular insert with such a deformable plastic element for locking engagement both with a surrounding complementary internally threaded member and with an inner complementary externally threaded member.

A troublesome one of these problems is to provide a satisfactory outer-inner torque differential, i.e., an adequately high ratio between the resistance to rotation of the tubular insert relative to the surrounding outer complementary member and the resistance to rotation of the inner complementary member relative to the tubular insert. If the differential is inadequate, any attempt to unscrew the inner complementary member from the installed tubular insert will be defeated by unscrewing of the installed insert from the outer complementary member.

The necessary tolerances in the dimensioning of mating external and internal screw threads results in variation of the clearances between randomly selected mating threads and therefore the outer-inner torque differential must be effective over the expected range of variation in such clearance. In other words, the torque differential should not be unduly effected by normal variations in the clearance between the mating threads externally of the tubular insert and the mating threads internally of the tubular insert.

Another problem peculiar to the use of a tubular insert is to prevent the locking element from being bodily displaced into the interior of the tubular insert when the tubular insert is initially threaded into a complementary outer threaded member.

Still another problem is to prevent peeling of the locking element and to prevent circumferential displacement of the locking element by the relative advance of the screw thread of the outer complementary member. The difficulty is that the cylindrical wall of a tubular insert is necessarily quite thin and therefore provides relatively little metal for anchoring engagement by a plastic locking element.

The present invention is directed to the satisfactory solution of these problems as well as other problems relating to a tubular insert that is provided with a transverse plastic locking element.

SUMMARY OF THE INVENTION

A transverse cut is made in the periphery of an externally and internally threaded tubular insert on a slant to conform to the helix angle of the external thread of the insert to produce a slot having a planar bottom wall that defines a chord of the circular cross section of the insert. The depth of the chordal slot is sufficient to extend slightly into the interior of the tubular insert and thus form a window in the cylindrical wall of the insert, the window interrupting the bottom wall of the slot and dividing the bottom wall into two spaced parts. As a result, the slot may be considered as divided into a central radial section defined by the window in the slot and two flanking radial sections defined by the two sides of the window and the two corresponding outer ends of the slot.

A locking element made of a suitable resiliently deformable plastic, such as nylon, seats in the slot and in a general way conforms to the configuration of the slot but extends radially outwardly far enough beyond that configuration for the desired locking action. Thus, the slot may be considered as bounded on its outer side by an imaginary arcuate extension of the outer circumferential surface of the tubular insert including extensions of the outer screw thread contours. A locking element conforming to the slot configuration as thus defined would have the same minor and major diameters as the external screw thread of the tubular insert and obviously the locking element must extend radially outward beyond this configuration for locking cooperation with the internal thread of a surrounding complementary member to create the required torque resistance. The all essential portion of the plastic locking element that extends beyond this theoretical outer boundary of the slot may be conveniently referred to as the enlargement portion of the locking element.

In a well known manner, the required torque resistance between the tubular insert and the surrounding complementary member is created in part by the locking element crowding the tubular insert laterally into pressure contact with the surrounding complementary member and is created in part by the pressure of the enlargement portion of the plastic element against the surrounding complementary member. These two torque-engendering effects occur at opposite ends of a diameter that intersects the above mentioned central radial sector of the slot.

In the practice of the invention that is presently preferred for screw sizes except exceedingly small sizes, the enlargement portion of the plastic locking element is essentially in the form of a central radial protrusion that lies wholly within the arc of the central radial sector of the slot, the enlargement being in radial alignment with the window. In effect, the central portion of the locking element in the central sector of the slot serves as a resiliently outwardly biased radial plunger, the outer end of which may be depressed by the surrounding complementary member to displace the plunger longitudinally inwardly into locking engagement with the inner complementary member.

It is to be borne in mind that a resilient plastic material such as nylon and such as elastomers, is practically incompressible and being flowable under substantial pressure are capable of acting hydraulically under pressurized confinement. Since the plastic material is, in effect, trapped under pressure in the two flanking sectors of the slot, the plastic material in the two flanking sectors act as hydraulic brake shoes against the surrounding complementary member. In addition, the pressure of the plastic material in the two flanking sectors against the corresponding portions of the bottom wall of the slot create lateral pressure against the tubular insert that crowds the tubular insert diametrically against the opposite wall of the surrounding complementary member.

The plastic material in the central sector acts as a hydraulic brake shoe against the outer complementary member but at the same time presses radially inwardly against the inner complementary member which in turn acts against the tubular insert to assist in pressing the tubular insert diametrically against the surrounding complementary member. The locking action on the inner complementary member is on the previously mentioned bisecting diameter, the locking action being in part the brake action of the inwardly displaced plastic material against the inner complementary member and in part the metal-to-metal pressure created by the diametrical crowding of the inner complementary member against the inner circumferential wall of the tubular insert.

It is apparent that the desired high outer-inner torque differential is inherent in the described relationships inasmuch as the pressure of the plastic material in the two flanking sectors of the slot is directed solely to the creation of the outer torque and the plastic pressure in the central sector of the slot that creates the inner torque also contributes to the outer torque in adding to the metal-to-metal pressure of the tubular insert against the outer complementary member. It is also to be noted that resiliently distorting the plastic material within its elastic limits in the central sector against the inner complementary member involves storing substantial energy in the form of stress in the body of the plastic material with the result that only a portion of the pressure applied by the outer complementary member is transmitted to the inner complementary member.

It has been found that the described relationships make the self-locking action effective over a wide range of tolerances with a desirably high torque differential over the entire range.

The plastic locking element is formed with screw thread portions on its outer side that substantially register with a corresponding portion of the external thread of the tubular insert at the opposite ends of the slot. The central radial protrusion of the plastic body is in effect superimposed on the outer formed screw thread portions of the plastic body, the radial protrusion spanning the valleys of the outer formed threads and preferably extending outwardly slightly beyond the major diameter of the external thread of the tubular insert. Forming the plastic body with thread portions on its outer side achieves the solution of preventing the outer complementary member from peeling the plastic body away from the bottom wall of the slot or tearing the plastic body or circumferentially displacing the plastic body.

The inner surface of the plastic locking element may also be formed with screw thread portions to match the corresponding portions of the internal screw thread of the tubular insert. In one practice of the invention, however, the inner side of the plastic body simply conforms to the chordal plane of the bottom wall of the slot and in another practice of the invention the inner surface of the plastic locking element is cylindrical and approximates the minor diameter of the internal screw thread of the tubular insert.

In a practice of the invention that is preferred for very small tubular inserts, for example, a tubular insert of the size of a 2-56 screw, the outer enlargement portion of the plastic body is not confined to the central sector of the slot but rather is extended over all three sectors. Since the enlargement portion has such a circumferential extent, it has a lesser radial dimension than a concentrated central protrusion and may lie well within the major diameter of the external screw thread of the tubular insert. This concept is carried out by forming the screw thread portions on the outer periphery of the plastic body with valleys that are substantially shallower than the valleys of the corresponding external screw thread of the tubular insert. Thus, the essential enlargement portion of the plastic body that extends outwardly beyond the heretofore defined slot configuration is in the form of material aligned with the valleys of the external screw thread of the tubular insert, the material of the enlargement portion lying between the major and minor diameters of the external screw thread of the tubular insert.

As heretofore stated, the chordal slot preferably conforms to the helix angle of the external screw thread of the tubular body. For sizes of the tubular insert of 6-32 and larger the transverse slot may approximate the width of two turns of the external screw thread of the tubular insert. Preferably such a slot extends from the crest of one turn of the external screw thread to the crest of a turn that is two turns removed from the one turn. In sizes smaller than 6-32, the transverse slot may be of the width of only one turn of the external screw thread of the tubular insert, the slot extending from the crest of one turn of the external thread of the tubular insert to the crest of the next adjacent turn of the external thread.

The features and advantages of the invention may be understood from the following detailed description and the accompanying drawings.

DESCRIPTION OF THE PREFERRED EMBODIMENTS OF THE INVENTION

Figure 13:
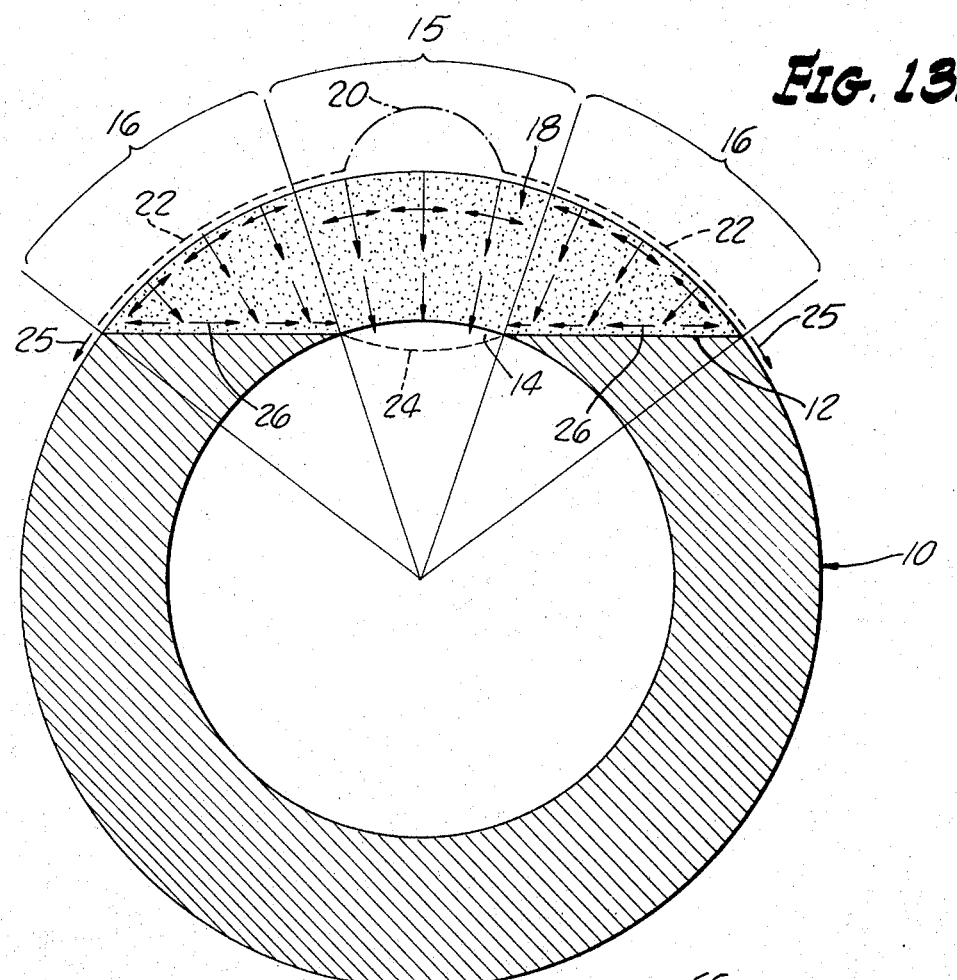
FIG. 13 is a diagram for the purpose of explaining the invention.

The underlying concept of the invention may be understood by referring first to the diagram of FIG. 13 which represents an externally and internally threaded tubular insert, generally designated 10, having a transverse slot with a bottom wall 12 in a plane that conforms to a chord of the circular configuration, the slot being cut on a slant to align with the helical turns of the outer screw thread. The slot penetrates the interior of the tubular insert slightly to form a window 14 in the tubular wall of the insert which is of substantially less width than the length of the bottom wall of the slot. In this instance, the width of the window is no greater than one-third the length of the bottom wall of the slot.

The opposite edges of the window 14 determine two radial lines which define a previously mentioned central sector 15 of the slot and the two side edges of the window together with the corresponding opposite ends of the slot determine radial lines which define two flanking sectors 16.

The configuration and volume of the slot will be considered as determined by an imaginary extension across the slot of the outer circumferential surface of the tubular insert including extensions of the turns of the outer screw thread of the insert. Thus, if a resiliently deformable locking element generally designated 18 and represented by stippling in FIG. 13 were to conform precisely to this defined configuration of the slot, it would merely replace the metal that has been removed to form the slot and would not be of sufficient radial dimension to provide a self-locking action. Obviously, the plastic locking element 18 must extend outwardly beyond the configuration of the slot sufficiently to accomplish two purposes, first to take up all of the clearance between the tubular insert and any outer complementary threaded member into which the insert may be installed, and second, to exert pressure on the inner circumferential wall of the outer complementary member for the desired self-locking action.

The purpose of the insert 18 that extends radially outwardly beyond the defined configuration of the slot will, for convenience, be referred to as the enlargement portion. In the preferred practice of the invention for all sizes of the insert except the smaller sizes, the enlargement portion of the insert is primarily in the form of a radial protrusion 20 that is outlined by an arcuate dot-dash line. It is to be noted that the enlargement portion 20 lies wholly within the central sector 15 and in this instance the enlargement portion is symmetrical to a diameter that bisects the central sector. In some instances the rest of the locking element 18 extends slightly beyond the outer boundary of the slot as indicated by dotted lines 22 and these flanking portions of the enlargement may function to take up at least some of the clearance between the tubular insert and the surrounding outer complementary member rather than to provide self-locking action. As will be explained, however, the central protrusion 20 is preferably omitted in any exceedingly small tubular insert, for example, an insert of the size 2-56, the self-locking action being then accomplished by an enlargement of the general configuration indicated by the dotted lines 22.

When the tubular insert 10 is installed in an outer complementary member having an internal screw thread, the radial protrusion 20 is depressed and crowds the tubular insert laterally against the surrounding complementary member to result in two different locking effects which occur at opposite ends of the diameter that bisects the central sector 15. One of these effects is the metal-to-metal pressure of the tubular insert against the inner circumferential wall of the outer complementary member in the region that is diametrically opposite from the radial protrusion 20 and, of course, the other locking effect is accomplished by the resiliently deformed protrusion 20 exerting radial outward pressure against the surrounding complementary member to serve in effect as a brake shoe.

The direction of least resistance to flow or displacement of the plastic material is radially inward from the central sector 15, the plastic material being displaced or bulged radially inwardly through the window 14 as indicated by the dotted line 24 for locking action against whatever inner complementary member may be threaded into the tubular insert.

The pressure that is built up in this manner in the central sector 15 is transmitted to the two flanking sectors 16, the pressure being exerted in all directions as indicated by the arrows. There is some tendency for the plastic material when highly pressurized to be extruded circumferentially along the clearance space at the two ends of the slot as indicated by the two arrows 25, but the resistance to such extrusion is of exceedingly high magnitude. There is also a tendency for the pressurized plastic material in the two flanking sectors 16 to be diverted towards the window 14 by the bottom wall 12 of the slot as indicated by the arrows 26. In the main, however, the plastic material in the two flanking sectors 16 behaves as a trapped pressurized fluid and the plastic material in the two flanking sectors function as hydraulic brake shoes against the surrounding complementary member. Thus, the plastic body provides outwardly acting brake shoes in the three radial sectors of the slot and functions as an inwardly acting brake shoe only in the central sector. It is apparent that by virtue of this fact the described structure inherently provides a desirably high outer-inner torque differential. It is to be noted that the braking thrust inwardly of the plastic of the central sector against the inner complementary member shifts the inner complementary member diametrically into locking pressure against the inner circumferential wall of the tubular insert and this diametrical thrust adds to the diametrical thrust of the tubular insert against the surrounding outer complementary member to favor the desired high torque differential.

The self-locking action is effective throughout the whole range of clearances that are encountered in the random mating of threaded parts. At one extreme the clearance between a tubular insert and the surrounding complementary member is at maximum where the pitch diameter of the internal screw of the outer complementary member is at the maximum in the range of permitted tolerance and the pitch diameter of the external screw thread of the tubular insert is at the minimum in the permitted range of tolerance. At the other extreme of the range, the clearance between the tubular insert and the surrounding complementary member is at a minimum with the pitch diameter of the internal thread of the outer complementary member at the minimum in its range of tolerance and the pitch diameter of the external screw thread of the tubular insert 10 at the maximum in its range of tolerance.

An important factor in the adaptability of the plastic locking element to the wide range of clearance between the tubular insert and the surrounding complementary member is that the radial protrusion 20 extends over only a minor portion of the circumferential extent of the plastic body and being relatively narrow is relatively free to spread circumferentially in opposite directions to compensate for variations in the clearance.

FIGS. 1 to 4 indicate the construction of an embodiment of the invention that is preferably used for all tubular insert sizes except the smaller sizes. The insert which is generally designated 27 has a chordal slot 28 which, as shown, is inclined in alignment with the turns of the external screw thread of the insert and which is of the width of two screw threads, extending from the crest of one screw thread across a second adjacent screw thread to the crest of a third screw thread.

A locking element 29 of suitable plastic material occupies the chordal slot and on its radially outward side is formed with screw thread portions 31, 32, and 33 which substantially register with corresponding screw portions of the external thread of the tubular insert at the opposite ends of the chordal slot.

Figure 1:
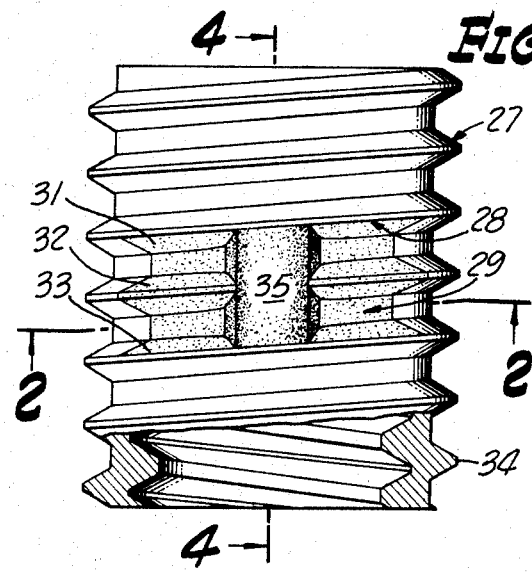
FIG. 1 is an elevational view partly in section of a self-locking insert embodying a construction in accordance with the present invention.
Figure 3:
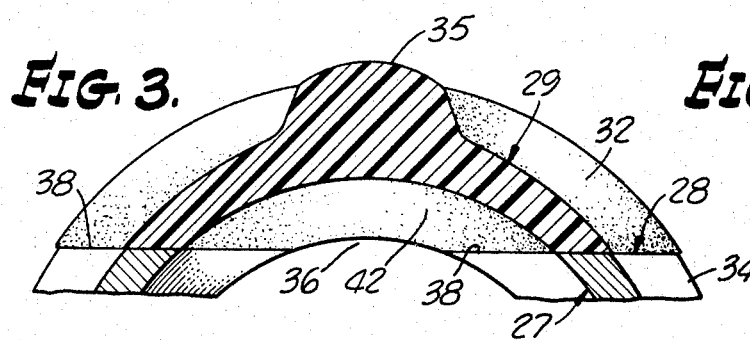
FIG. 3 is an enlarged portion of FIG. 2.
Figure 4:
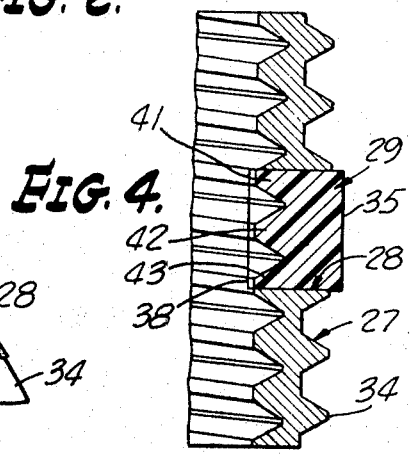
FIG. 4 is an enlarged section along the line 4—4 of FIG. 1.

As shown in FIG. 3, the crests of the formed thread portions of the locking element extend slightly outwardly beyond the major diameter 34 of the external screw thread of the tubular insert but the locking action of the plastic body is accomplished primarily by a central radial protrusion 35 which, as shown in FIG. 3, extends radially beyond the major diameter 34 and as shown in FIG. 1 extends across the two valleys of the formed thread portions 31-33 of the plastic body.

As shown in FIG. 3 the chordal slot 28 is deep enough to penetrate the interior of the tubular insert and thereby form a window 36 which divides the bottom wall 38 of the chordal slot into two spaced parts.

Providing the locking element 29 with the thread portions 31-33 facilitates screw threaded advance of the internal screw thread of the outer complementary member across the plastic body and thus eliminates any tendency for the plastic body to be peeled away from a bottom wall 38 or to be sheared or to be circumferentially displaced.

In this particular embodiment of the invention the inner circumferential surface of the plastic locking element 29 is further provided with formed thread portions 41, 42, and 43 that match the adjacent thread portions of the internal screw thread of the tubular insert at opposite sides of the window 36.

Figure 2:
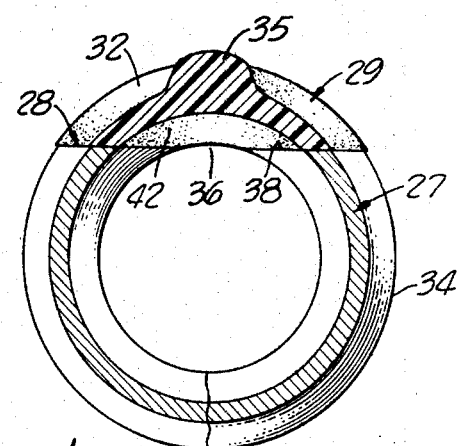
FIG. 2 is a transverse section taken along the line 2—2 of FIG. 1.
Figure 5:
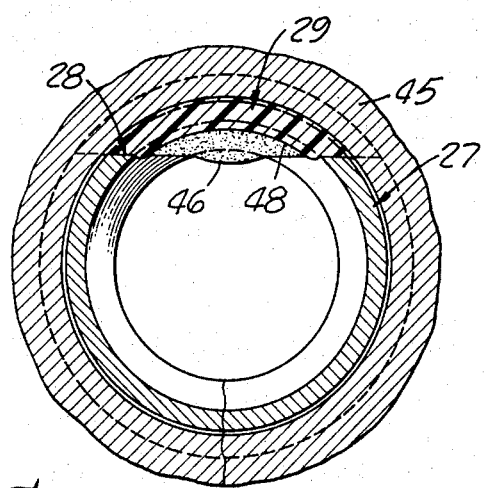
FIG. 5 is a transverse sectional view showing the cylindrical body of FIG. 1 installed in an internally threaded complemental member.

FIG. 5 shows the tubular insert 27 installed in a surrounding internally threaded complementary body 45 which may be a nut or may be a plate or casting. Since the window in the cylindrical wall of the insert 27 is cut across the internal screw thread of the insert, the window varies in width, being relatively narrow where the window intersects a turn of the internal screw thread of the tubular insert, as shown in FIGS. 2 and 3, and being relatively wide where the window intersects a valley between two turns of the internal screw thread. FIG. 5 shows by an arcuate line 46 how the plastic material bulges radially inwardly where the window is relatively narrow and shows by a longer arcuate line 48 how the plastic material bulges inwardly where the window is relatively wide at the intersection of a valley of the internal screw thread of the tubular insert.

Figure 6:
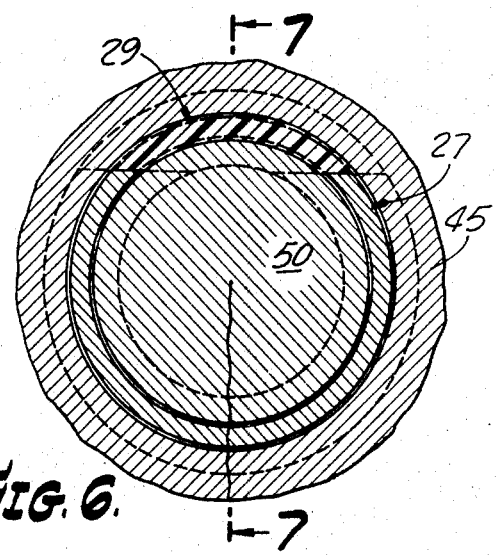
FIG. 6 is a similar view with an externally threaded inner complementary member threaded into the tubular insert.
Figure 7:
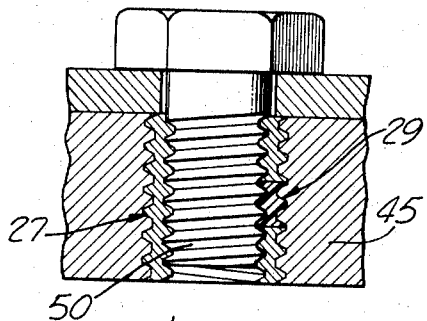
FIG. 7 is a section on a reduced scale along the line 7—7 of FIG. 6.

FIGS. 6 and 7 show how an externally threaded inner complementary member in the form of a screw 50 may be threaded into the installed tubular insert 27 and locked therein by the inwardly bulging plastic material of the locking element 29.

In the presently preferred practice of the invention tubular insert sizes 6-32 and larger are constructed as indicated in FIGS. 1-4 with the chordal slot and the locking element therein of a width of two turns of the external screw thread of the tubular insert as heretofore described. Tubular inserts smaller than 6-32 and larger than 2-56 are of the same construction with a central radial protrusion but the slots and the locking elements therein are of a width of only one turn of the external screw thread instead of being the width of two turns.

Preferably, the smallest sized insert 2-56 is of a width of only one turn of the external screw thread of the tubular insert and the locking element in the slot does not have a previously described central protrusion. Such a construction is shown in FIGS. 8-10.

Figure 8:
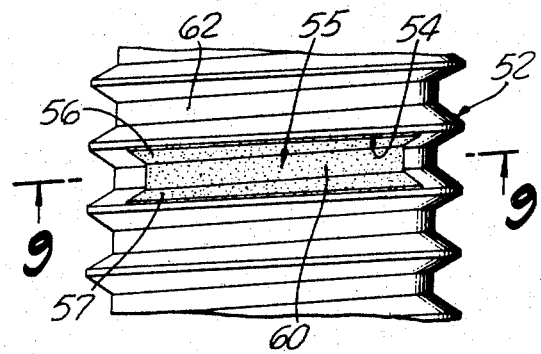
FIG. 8 is a fragmentary elevation of an alternate embodiment of the invention.
Figure 9:
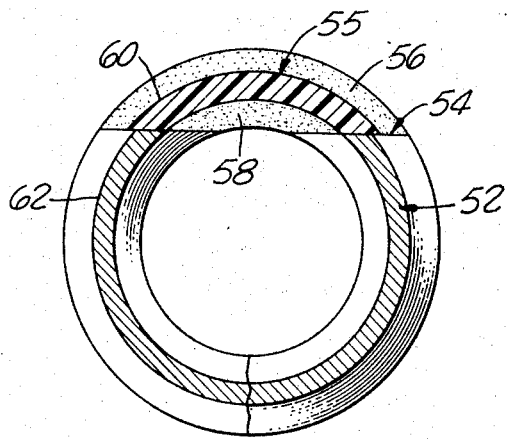
FIG. 9 is a transverse sectional view taken along the line 9—9 of FIG. 8.
Figure 10:
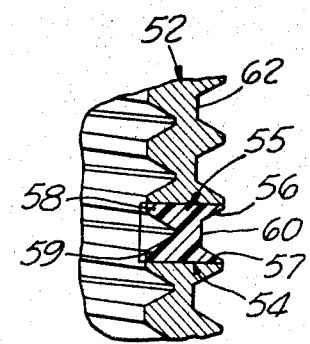
FIG. 10 is a fragmentary longitudinal sectional view taken through a peripheral portion of the alternate embodiment of FIG. 8.

In the second embodiment of the invention shown in FIGS. 8, 9, and 10, an internally and externally threaded tubular insert 52 has a slanted, transverse peripheral slot 54 of the character heretofore described which is of a width of only one turn of the external screw thread of the tubular insert. The slot extends from one crest of an external screw thread across a valley to the crest of the next turn as may be seen in FIG. 8.

A plastic locking element 55 seated in the chordal slot 54 is formed with external thread portions 56 and 57 that substantially register with corresponding portions of the outer screw thread of the tubular insert at the opposite ends of the slot. As shown in FIGS. 9 and 10, the locking element 55 is further formed with internal thread portions 58 and 59 which register with corresponding portions of the internal screw thread of the tubular insert.

In this second embodiment of the invention the enlargement portion of the plastic locking element is of the character indicated by the dotted line 22 in FIG. 13 instead of being of the character of a central radial protrusion. The enlargement portion, i.e., the portion that lies radially outwardly from the previously defined configuration of the chordal slot 54 is located in the valley that is bound by the outer thread portions 56 and 57 of the locking element. For this purpose the valley 60 of the exterior of the locking element is of less depth than the valleys 62 formed by the external screw thread of the insert, as may be seen in FIG. 10.

The difference between the depths of the valleys 60 and 62 provides sufficient plastic material outside of the configuration of the slot to take up the maximum clearance that may occur between the tubular insert and the surrounding complementary member and in addition provides sufficient material to cooperate with the inner circumferential surface of the surrounding complementary member to create the heretofore described locking action.

Figure 11:
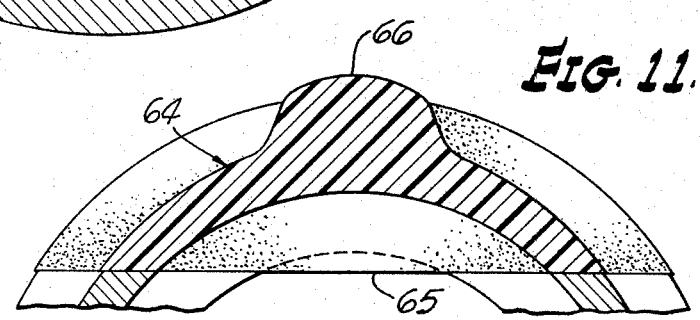
FIG. 11 is a fragmentary transverse sectional view illustrating another embodiment of the invention.

FIG. 11 illustrates a modification of the invention in which a plastic locking element 64 is of the same construction as the locking element 29 in the first embodiment of the invention except for the fact that an inner side 65 of the plastic locking element is in the same chordal plane as the slot and extends straight across the window in the tubular wall as shown. Thus, the inner side 65 of the plastic locking element interferes with the external thread of an inner complementary member, the pressure of the inner side of the locking element against the inner complementary member being augmented by the usual radially outward protrusion 66.

Figure 12:
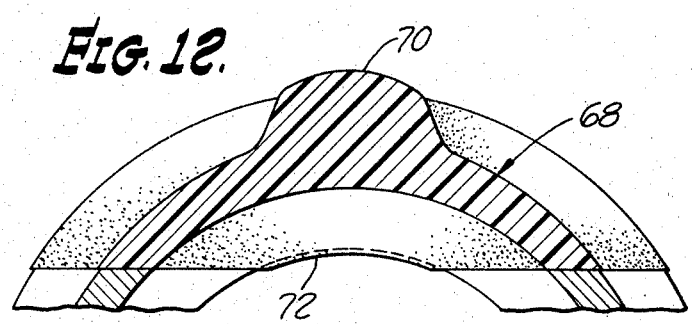
FIG. 12 is a similar view of still another embodiment of the invention.

FIG. 12 shows another modification of the invention wherein a plastic locking element 68 has the usual radial protrusion 70 but the inner surface 72 of the insert is cylindrically curved to conform approximately to the minor diameter of the internal screw thread of the tubular member. Thus, the radially inner side of the locking element 68 interferes with the external screw thread of an inner complementary member with the pressure of the plastic material against the inner complementary member augmented by the action of the radial protrusion 70.

The description in specific detail of the selected embodiments of the invention will suggest various changes, substitutions and other departures from the disclosure within the spirit and scope of the invention.

I claim:

1. In an internally and externally threaded tubular insert designed to create torque resistance between the tubular insert and an inner complementary threaded member and to create substantially greater torque resistance between the tubular insert and an outer complementary threaded member, the combination of, an elongate slot in the tubular insert having a greater length than width, said slot being positioned with its length axis transverse to the axis of the insert and forming a central window in the cylindrical wall of the insert, with two generally flat portions of the bottom wall of the slot spaced apart by the window and extending in opposite lateral directions from the window in generally coplanar relation, the opposite sides of the window defining a transverse central radial sector and the opposite sides of the window together with the corresponding opposite ends of the slot forming two transverse radial sectors flanking the central sector; and a transversely extending locking element of deformable material seated in the slot with opposite end portions against the bottom wall portions thereof and spanning the window, said locking element occupying the space in the slot that is bounded by the imaginary extension of the outer circumferential surface of the tubular insert across the slot, said locking element extending radially outwardly beyond the outer boundary of the slot to cooperate lengthwise with a portion of the inner circumferential surface of an outer complementary member thereby to displace the tubular insert laterally against the diametrically opposite portion of the inner circumferential surface of the outer complementary member, whereby threading the tubular insert into an outer complementary member traps the material of the locking element in said flanking sectors of the slot and places the material of the locking element under compression with the lines of least flow resistance of the material extending through the window to cause the locking element to bulge inwardly of the window into locking engagement with an inner complementary member that is threaded into the tubular insert.

2. In an internally and externally threaded tubular insert designed to create torque resistance between the tubular insert and an inner complementary threaded member and to create substantially greater torque resistance between the tubular insert and an outer complementary threaded member, the combination of:

an elongate slot in the tubular insert having a greater length than width, said slot being positioned with its length axis transverse to the axis of the insert and forming a central window in the cylindrical wall of the insert, with two portions of the bottom wall of the slot spaced apart by the window and extending in opposite lateral directions from the window, the opposite sides of the window defining a transverse central radial sector and the opposite sides of the window together with the corresponding opposite ends of the slot forming two transverse radial sectors flanking the central sector; and a transversely extending locking element of deformable material seated in the slot with opposite end portions against the bottom wall portions thereof and spanning the window, said locking element occupying the space in the slot that is bounded by the imaginary extension of the outer circumferential surface of the tubular insert across the slot, including extensions of the outer thread of the tubular insert, and said locking element having a radial protrusion located in said central sector and extending radially outwardly beyond the outer boundary of the slot to cooperate lengthwise with a portion of the inner circumferential surface of the outer complementary member to displace the tubular insert laterally against the diametrically opposite portion of the inner circumferential surface of the outer complementary member, and compensate for the inward bulge of the locking material inwardly of the window to maintain a high torque resistance with the outer complementary member, whereby threading the tubular insert into an outer complementary member traps the material of the locking element in said flanking sectors of the slot and places the material of the locking element under compression with the lines of least flow resistance of the material extending through the window to cause the locking element to bulge inwardly of the window into locking engagement with an inner complementary member that is threaded into the tubular insert.

3. A combination as set forth in claim 2 in which the radially outer side of the locking element is formed with portions of screw threads at its opposite ends substantially registering with portions of the external screw thread of the tubular insert at the opposite ends of the slot, said protrusion being devoid of threads and extending across the valleys of the formed portions of screw threads.

4. A combination as set forth in claim 3 in which the inner radial side of the locking element is formed with portions of screw threads that substantially register with adjacent portions of the internal screw threaded tubular insert.

5. A combination as set forth in claim 3 in which said protrusion extends from the minor diameter of the formed portions of screw threads radially outward beyond the major diameter of the formed portions of screw threads.

6. A combination as set forth in claim 3 in which said slot is inclined in alignment with the helical turns of the external screw thread of the tubular insert and is of a width of at least one turn of the external screw thread of the tubular insert.

7. A combination as set forth in claim 6 in which the width of the slot and the locking element therein is approximately the width of two turns of the external screw thread of the tubular member.

8. A combination as set forth in claim 7 in which said slot extends in width from the crest of one turn of the external screw thread of the tubular insert to the crest of a turn that is two turns removed from said one turn.

9. A combination as set forth in claim 2 in which the bottom wall of the slot conforms to a chord of the circular cross sectional configuration of the tubular insert and in which the inner side of the locking element conforms to the same chord.

10. A combination as set forth in claim 9 in which the outer side of the locking element is formed with portions of screw threads substantially registering with portions of the external screw thread of the tubular insert at opposite ends of the slot.

11. A combination as set forth in claim 3 in which the inner side of the locking element that spans the window is of cylindrical configuration corresponding approximately to the minor diameter of the internal screw thread of the tubular insert.

12. In an internally and externally threaded tubular insert designed to create torque resistance between the tubular insert and an inner complementary threaded member and to create substantially greater torque resistance between the tubular insert and an outer complementary threaded member, the combination of:
   an elongate slot in the tubular insert having its length axis positioned transverse to the axis of the insert forming a central window in the cylindrical wall of the insert, two generally flat portions of the bottom wall of the slot being spaced apart by the window and extending in opposite lateral directions from the window in generally coplanar relation,
   the opposite sides of the window defining a central radial sector and the opposite sides of the window together with the corresponding opposite ends of the slot forming two radial sectors flanking the central sector; and
   a locking element of deformable material seated in the slot against the bottom wall thereof and spanning the window, said locking element occupying the space in the slot that is bounded by the imaginary extension of the outer circumferential surface of the tubular insert across the slot including extensions of the outer thread of the tubular insert,
   said locking element being formed with external portions of screw threads extending along the lengths axis and substantially registering with adjacent portions of the external screw thread of the tubular insert at opposite ends of the slot,
   whereby a peripheral portion of the locking element lies between the major and minor diameters of the external screw thread of the insert,
   said locking element being further formed with the inner side thereof that spans the window having at least a portion thereof corresponding approximately to the minor diameter of the internal screw thread of the insert,
   whereby threading the tubular insert into a complementary outer member causes the screw thread of the outer complementary member to displace said peripheral portion of the locking element radially inwardly to place the locking element under compression,
   the volume of said peripheral portion being selected to cause the compressed locking element to bulge inwardly through the window into locking engagement with an inner complementary member.

13. In an internally and externally threaded tubular insert designed to create torque resistance between the tubular insert and an inner complementary threaded member and to create substantially greater torque resistance between the tubular insert and an outer complementary threaded member, the combination of:
   an elongate slot in the tubular insert having its length axis positioned transverse to the axis of the insert forming a central window in the cylindrical wall of the insert, two generally flat portions of the bottom wall of the slot being spaced apart by the window and extending in opposite lateral directions from the window in generally coplanar relation,
   the opposite sides of the window defining a central radial sector and the opposite sides of the window together with the corresponding opposite ends of the slot forming two radial sectors flanking the central sector; and
   a locking element of deformable material seated in the slot against the bottom wall thereof and spanning the window, said locking element occupying the space in the slot that is bounded by the imaginary extension of the outer circumferential surface of the tubular insert across the slot including extensions of the outer thread of the tubular insert,
   said locking element being formed with external portions of screw threads extending along its length axis and substantially registering with adjacent portions of the external screw thread of the tubular insert at opposite ends of the slot but with the valleys of the formed thread portions substantially shallower than the valleys of the adjacent portions of the external screw thread of the tubular insert,
   whereby a peripheral portion of the locking element lies outside said extended outer circumferential surface of the tubular insert and lies between the major and minor diameters of the external screw thread of the insert,
   whereby threading the tubular insert into a complementary outer member causes the screw thread of the outer complementary member to displace said peripheral portion of the locking element radially inwardly to place the locking element under compression, the volume of said peripheral portion being selected to cause the compressed locking element to bulge inwardly through the window into locking engagement with an inner complementary member.

14. A combination as set forth in claim 13 in which said locking insert is formed on its inner side with portions of screw threads substantially registering with corresponding portions of the internal screw thread of the tubular insert.

15. A combination as set forth in claim 13 in which said slot is inclined into alignment with the turns of the external screw thread of the tubular insert.

16. A combination as set forth in claim 15 in which the width of the slot is substantially the width of a single turn of the external thread of the tubular insert.

17. A combination as set forth in claim 16 in which the slot extends in width from substantially the crest of one turn of an external screw thread of the tubular insert to substantially the crest of a next adjacent turn.

* * * * *

UNITED STATES PATENT OFFICE
CERTIFICATE OF CORRECTION

Patent No. 3,670,794        Dated June 20, 1972

Inventor(s) William F. Beidler

It is certified that error appears in the above-identified patent and that said Letters Patent are hereby corrected as shown below:

On the front page, the assignee of record should read --Threadline Fastener Corporation--.

Signed and sealed this 31st day of October 1972.

(SEAL)
Attest:

EDWARD M. FLETCHER, JR.        ROBERT GOTTSCHALK
Attesting Officer        Commissioner of Patents